United States Patent

Marshall et al.

[15] 3,640,066
[45] Feb. 8, 1972

[54] HYDRAULIC POWER TRANSMISSION SYSTEMS

[72] Inventors: John Stephen Marshall, Birmingham; William S. Turnbull, Wolver-Hampton, both of England

[73] Assignee: Rubery, Owen and Company Limited, Darlaston, Wednesbury, Staffordshire, England

[22] Filed: Dec. 9, 1969

[21] Appl. No.: 883,658

[30] Foreign Application Priority Data

Dec. 10, 1968    Great Britain ..................... 58,619/68

[52] U.S. Cl. ............................................. 60/53 R, 91/414
[51] Int. Cl. ................................. F16d 31/00, F15b 11/16
[58] Field of Search ................................. 60/53 R; 91/414

[56] References Cited

UNITED STATES PATENTS

| | | | |
|---|---|---|---|
| 1,354,209 | 9/1920 | Peterson | 60/53 R |
| 2,370,526 | 2/1945 | Doran | 60/53 C |
| 3,217,493 | 11/1965 | Kempson et al. | 60/53 R |
| 3,229,466 | 1/1966 | Soyland et al. | 60/53 R |
| 3,376,703 | 4/1968 | Buczynski | 60/53 R |

*Primary Examiner*—Edgar W. Geoghegan
*Attorney*—Scrivener, Parker, Scrivener and Clarke

[57] ABSTRACT

When the fluid supply to an hydraulic motor normally driving a vehicle is insufficient to maintain the momentum of the vehicle, pressure reversal occurs in the motor which then acts as a pump. A relief valve, in addition to the main relief valve, is included in the vehicle transmission system to limit the pressure in the system only when this overrun condition occurs. When the system includes two or more motors a valve is provided to isolate one of the motors from the fluid supply. A single valve assembly includes the additional relief valve, its ancillary control valves and the isolating valve.

7 Claims, 6 Drawing Figures

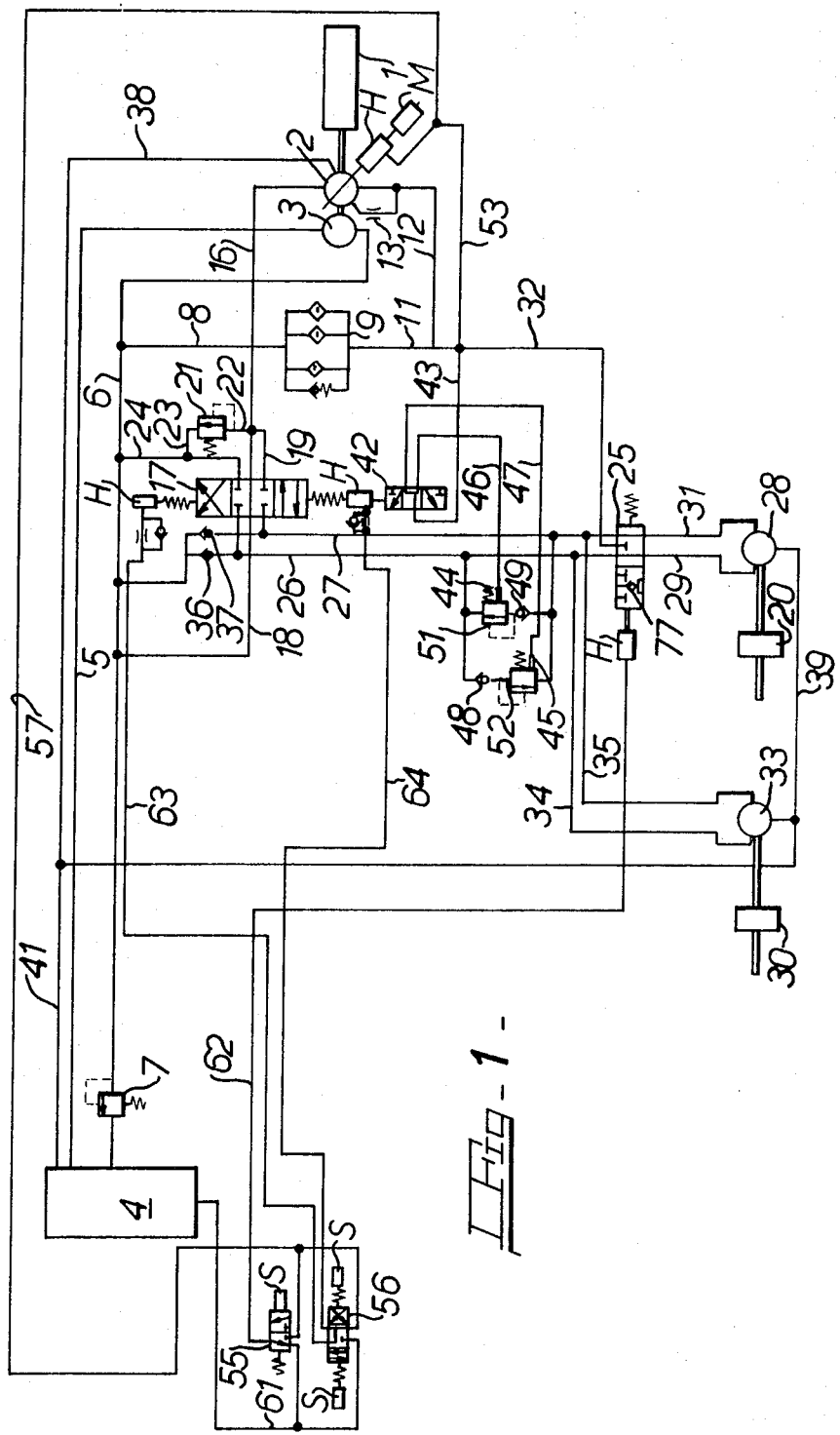

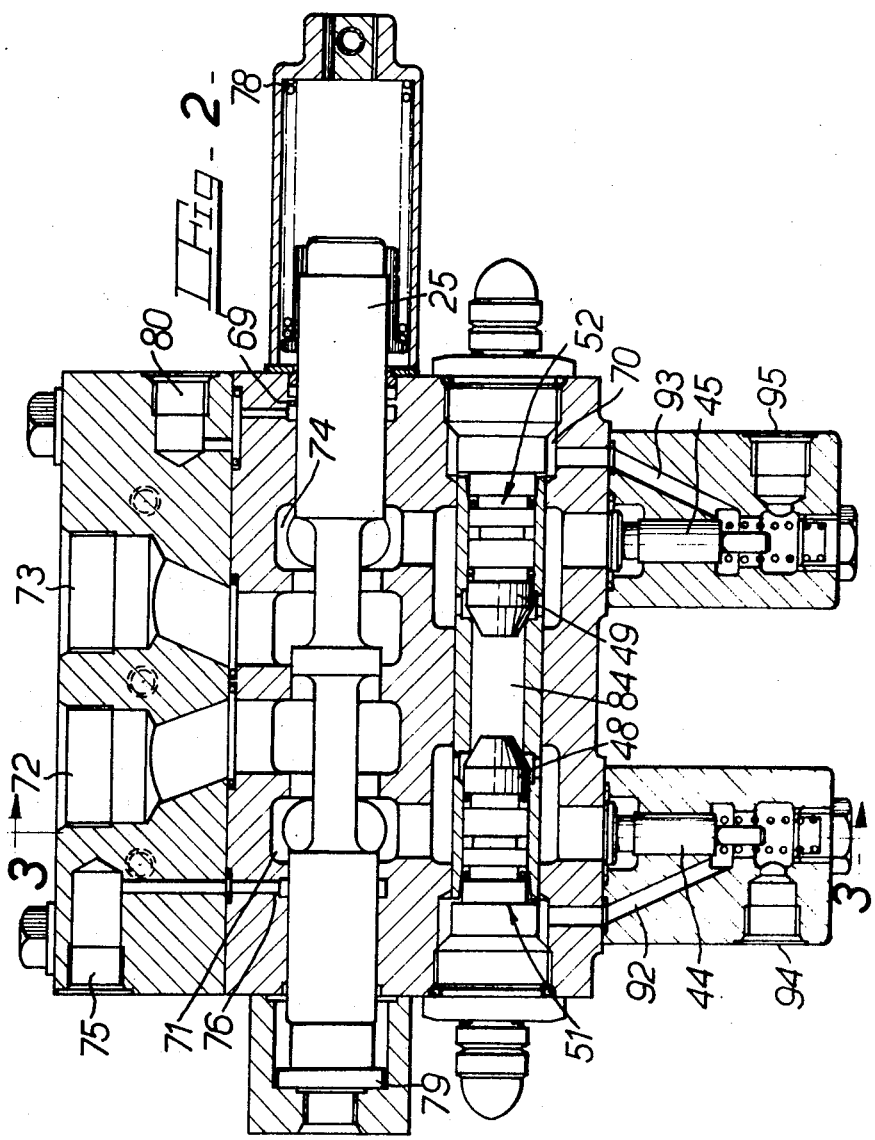

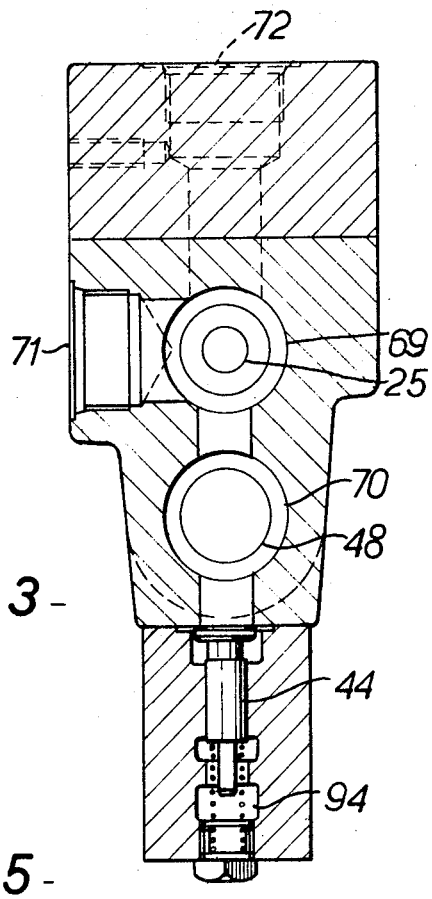
Fig-3-
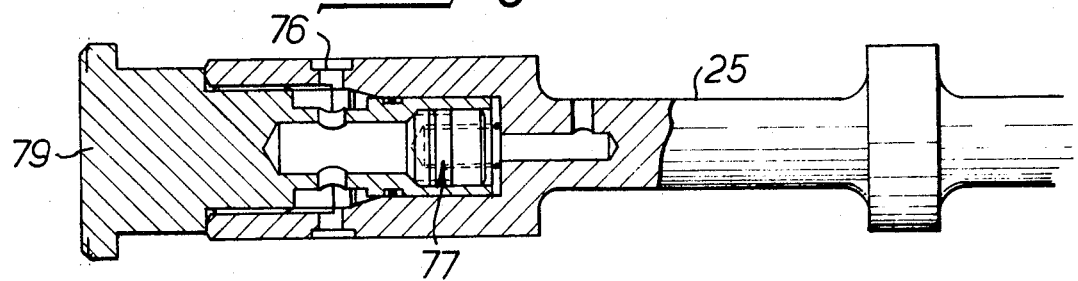
Fig-5-
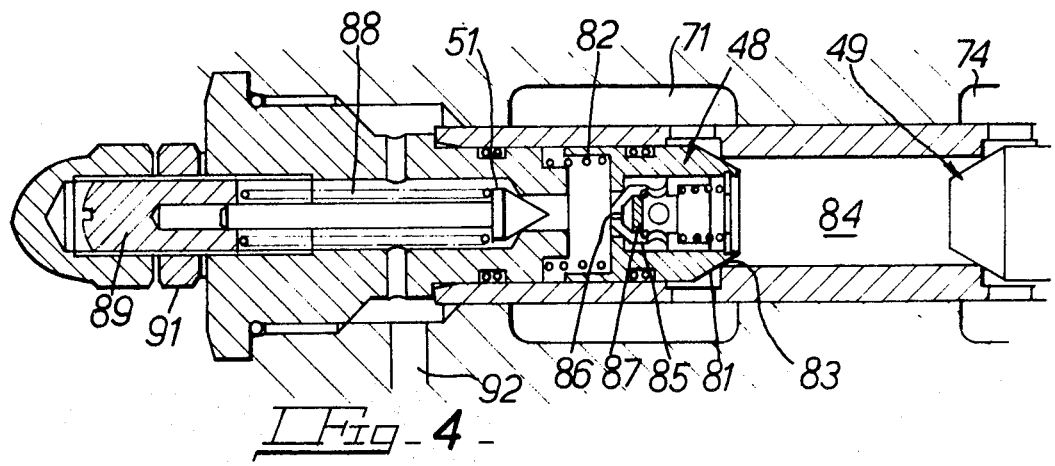
Fig-4-

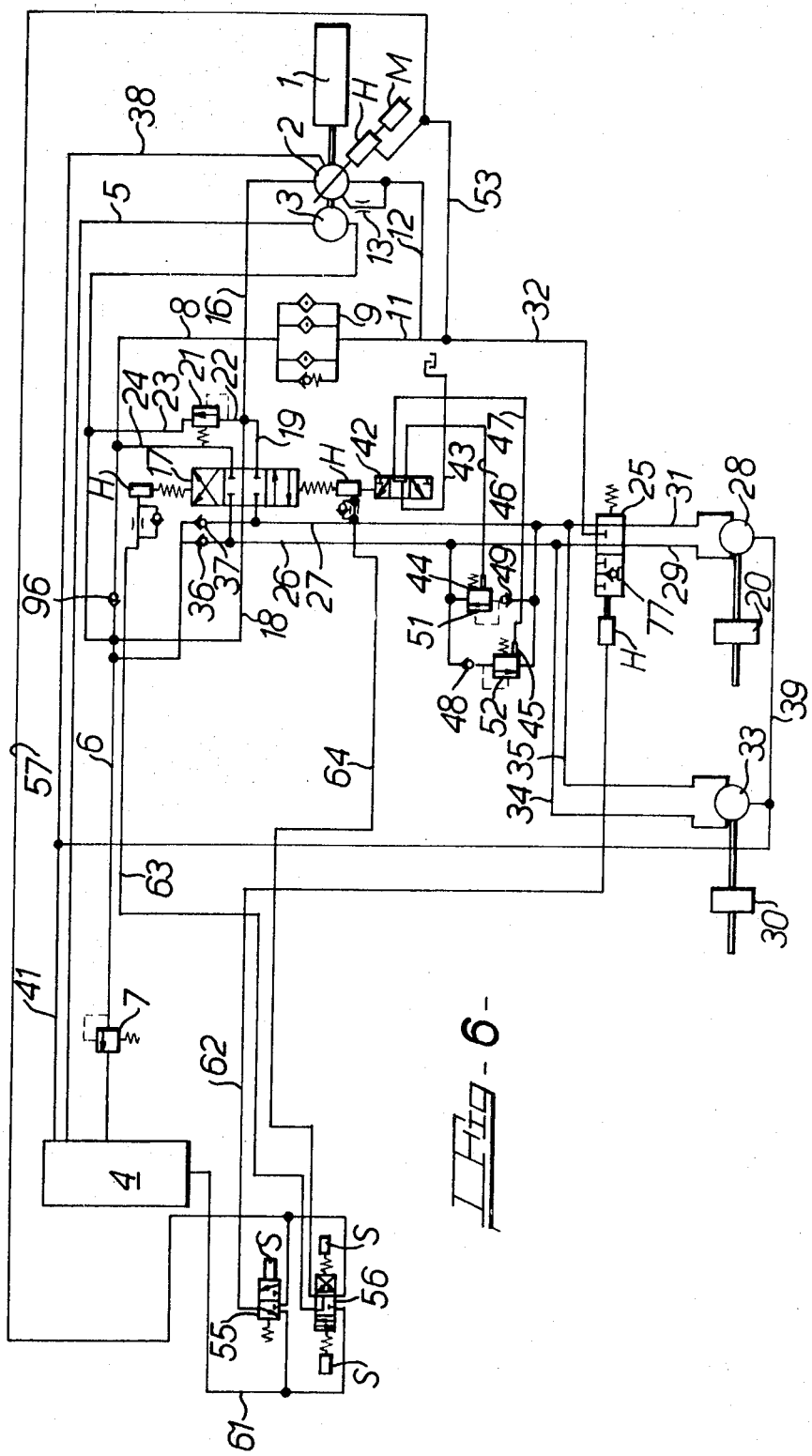
Fig-6-

HYDRAULIC POWER TRANSMISSION SYSTEMS

This invention relates to improvements in hydraulic power transmission systems.

When an hydraulic motor supplied with fluid under pressure by a pump is employed to drive a member or propel a vehicle having appreciable momentum and the fluid supply to the motor falls below that which is required to maintain the momentum of the member or vehicle the motor is driven and acts as a pump and this may lead to the development of excessive fluid pressure which can cause damage.

According to one feature of our invention, an hydraulic transmission system comprises an hydraulic motor coupled to a member having appreciable inertia, a first valve limiting the maximum pressure in the system to a predetermined value less than the maximum and means to render the second valve inoperative when the motor is driving the member and to permit it to operate when the member is driving the motor on overrun of the member.

Thus when the member which is normally driven by the motor overruns after the supply of fluid from the pump to the motor has fallen below that which is required to maintain the momentum of the member, it may be arranged that the maximum pressure which can be generated in the system is that determined by the second valve.

According to another feature of our invention, a system in which a pump normally supplies fluid under pressure to two or more hydraulic motors is provided with means for isolating one of the motors from the pump and for cross-connecting the supply and return lines of that motor to permit it to idle, fluid preferably being supplied to circulate idly through the motor for cooling.

That arrangement is particularly applicable to an hydraulic drive for a vehicle in which a power-driven pump supplies fluid to two or more hydraulic motors each driving a wheel of the vehicle, and pressure fluid can be supplied to one or each motor to give different speed ranges.

An hydraulic transmission system for a vehicle incorporating both features of our invention is described by way of example and illustrated by the accompanying drawings in which:

FIG. 1 is an hydraulic circuit diagram for a vehicle transmission, showing the drive to the wheels on one side of the vehicle only;

FIG. 2 is a part cross-sectional elevation of a valve assembly;

FIG. 3 is a section on line 3—3 of FIG. 2;

FIGS. 4 and 5 are enlarged sectional details of FIG. 2; and

FIG. 6 is a modification of the circuit diagram of FIG. 1.

Referring to FIG. 1, a prime mover 1, for example a diesel engine, is coupled to a variable delivery swashplate-type pump 2 and a boost or filling pump 3.

The boost pump 3 draws liquid from a reservoir 4 via a conduit 5 and delivers liquid to a conduit 6 at a pressure determined by the setting of a relief valve 7 which relieves to reservoir 4. This pressure may be of the order of 100 p.s.i.

The suction side of pump 2 is connected to conduit 6 via a conduit 8, a filter 9, and conduits 11, 12. A flow also passes from conduit 12 via a restrictor 13 to cool the casing of pump 2. Pressure liquid from the pump 2 passes through a conduit 16 to a three position hydraulically operated direction control valve 17 and from there to conduit 6 via a conduit 18 when the valve 17 is in the neutral position, as shown. The conduit 16 has a further connection to control valve 17 via a conduit 19 and to a main transmission relief valve 21 (the first valve) via a conduit 22. The valve 21 limits the maximum pressure in the system and may be set to relieve at say 3,000 p.s.i. into a conduit 23 which is connected to conduit 6 and control valve 17 via a conduit 24.

The direction control valve 17 is connected to first and fourth ports of a first slide valve 25, which will be described more particularly with reference to FIG. 2, via conduits 26, 27. Second and third ports of valve 25 are connected to a hydrostatic motor 28 via conduits 29, 31. A fifth port of valve 25 is connected to the discharge from boost pump 3 at conduit 11 via a conduit 32. A second hydrostatic motor 33 is connected to conduits 26, 27 via conduits 34, 35. Conduit 6 is connected to conduits 26, 27 by nonreturn valves 36, 37. Drainage and cooling flow from pump 2 and motors 28, 33 is returned to the reservoir 4 via conduits 38, 39 and 41. Motors 28, 33 are coupled to the rear and front wheels 20, 30 respectively on one side of the vehicle. The system is duplicated to drive wheels on the other side of the vehicle.

A second slide valve 42, the direction definition valve, is mechanically coupled to the direction control valve 17 for operation. Valve 42 has a port connected to the discharge from boost pump 3 at conduit 11 by a conduit 43. Further ports of valve 42 are connected to outlet ports of third and fourth slide valves 44, 45 by conduits 46, 47.

Conduit 27 is connected to the upstream side of a nonreturn valve 49 and to a pilot operated relief valve 51. The third slide valve 44 is operable to obstruct flow from the pilot relief valve 51. Similarly conduit 26 is connected to the upstream side of a nonreturn valve 48 and to a pilot operated relief valve 52. The fourth slide valve 45 is operable to obstruct flow from the pilot relief valve 52. The two combinations of pilot relief valve and slide valve are indicated generally in FIG. 1, but a construction of the valve combination is illustrated in FIGS. 2–5.

When the pilot relief valve 51 is open, flow can pass from conduit 27 to conduit 26 and when pilot relief valve 52 is open, flow can pass from conduit 26 to conduit 27, the flow from the respective pilots passing through slide valves 44, 45 to conduits 46, 47.

The output of the variable delivery pump 2 is varied in known manner by manual operation of an hydraulic control valve which admits pressure liquid to an hydraulic jack to move the swashplate. This is shown diagrammatically in FIG. 1, the pressure liquid being supplied via a conduit 53 from the boost pump discharge at conduit 11. This supply is also led to two solenoid operated valves 55, 56 via a conduit 57.

Solenoid operated valve 55 is connected to reservoir 4 via a conduit 61 and to a hydraulically operated pilot of the first slide valve 25 by a conduit 62. When the solenoid is deenergized the pilot of valve 25 is connected to reservoir 4 and a biassing spring causes valve 25 to assume the position shown in FIG. 1. When the solenoid is energized valve 55 changes over so that the boost pump discharge pressure in conduit 57 is applied to the pilot valve 25. Valve 25 changes over blanking conduits 26, 27 and cross-connecting conduits 29, 31 and at the same time connecting them to boost pump discharge pressure in conduit 32 via a check valve 77 in the valve 25.

Solenoid operated valve 56 is connected to reservoir 4 by conduit 61 and is also connected to hydraulically operated pilots for direction control valve 17 by conduits 63, 64. When both solenoids of valve 56 are deenergized both pilots are connected to boost pump discharge pressure in conduit 57 so that valve 17 is held in the position shown in which all of the conduits 19, 24, 26 and 27 are blanked and conduits 16 and 18 are connected to allow liquid to flow through the pump 2. Springs are provided to bias valves 17 and 56 into the neutral position. When one solenoid is energized the valve 56 is changed over to connect one of the pilots of valve 17 to boost pump discharge pressure and the other to reservoir. When the other solenoid is energized valve 56 is changed to its third position reversing the previous connections to the pilots of valve 17.

When the vehicle is at rest with the transmission in neutral the various valves are in the positions shown in FIG. 1. The engine 1 may be running, driving the boost pump 3 and variable delivery pump 2. The motors 28, 33 are hydraulically locked by the blanking of conduits 26, 27 at direction control valve 17 and by the nonreturn valves 36, 37.

Assume the vehicle is driven in a forward direction when the conduit 26 is connected to the conduit 19 by the direction control valve 17 and in reverse when the conduit 27 is connected to the conduit 19. The driver selects forward motion by energizing the right-hand (as shown) solenoid of valve 56 to apply boost pump discharge pressure in conduit 57 to conduit 63 and cause direction control valve 17 to be changed over so as to connect conduits 19 to 26 and 24 to 27 and to blank conduit 18. Simultaneously the direction definition valve 42 is changed over connecting conduits 46 and 43 and blanking conduit 47. The conduit 64 is connected to reservoir 4 through valve 56 and conduit 61. The manual control for pump 2 is now operated to cause delivery of liquid from pump 2 to motors 28, 33, the flow being shared by the motors which are hydraulically connected in parallel. Increase in pressure in conduit 26 will operate third slide valve 44 to blank off outlet from pilot relief valve 51 and pilot relief valve 52 is blanked off at the direction definition valve 42. Therefore acceleration of the vehicle will be limited by the main relief valve 21 (the "first" valve).

After the vehicle has been set in motion the solenoid of valve 55 may be energized to enable the vehicle to be driven at a higher speed. Energization of the solenoid of valve 55 connects boost pump discharge pressure in conduit 57 to conduit 62 causing the first slide valve 25 to change over. The motor 28 is now disconnected from conduits 26, 27 and connected to boost pump discharge in conduit 32. Motor 28 now idles and the whole of the discharge from pump 2 passes to motor 33 enabling the vehicle to be driven at a higher speed.

On deenergization of the solenoid of valve 55 the first slide valve 25 will revert to the position shown so that the motor 28 is reconnected to pump 2, reducing the flow to motor 33. The inertia of the vehicle will now tend to drive the motors 28, 33 as pumps and so drive pump 2 as a motor. This will be resisted by the engine 1 and a retarding force will be applied to the vehicle.

There will be a pressure reversal in conduits 26, 27. Increase of pressure in conduit 27 will cause the fourth slide valve 45 to be operated but this has no effect since conduit 47 is already blanked at valve 42. Reduction in pressure in conduit 26 allows reversion of the third slide valve 44 thus opening the outlet from the first pilot relief valve 51 and enabling it to lift. However, since the direction control valve is in the forward drive position the conduit 27 is connected through conduits 24 and 6 to the relief valve 7. Consequently, since relief valve 7 lifts at a lower pressure than pilot relief valve 51, the retarding force applied to the vehicle will be governed by the setting of the relief valve 7 and the losses around the circuit and the vehicle will be gently braked until the demand of motors 28, 33 matches the output of pump 2. Cavitation in conduit 26 will be prevented by admission of boost pump discharge through nonreturn valve 36 from conduit 6.

If the driver wishes to stop quickly he can apply maximum safe retarding force by deenergizing the solenoid of valve 56 to revert the direction control valve 17 and the direction definition valve 42 to their neutral positions. The conduit 27 is now disconnected from relief valve 7 and conduits 46 and 47 are both connected to conduit 43. Consequently, if the pressure in conduit 27 rises sufficiently, flow past nonreturn valve 49 will cause pilot relief valve 51 to lift and conduit 27 then relieves to conduit 26, the pilot flow from relief valve 51 passing via slide valve 44 to conduits 46 and 43.

It will be appreciated that the overrun condition can occur when both motors 28, 33 are selected to drive or when only the motor 33 is selected to drive, that is to say when the valve 25 is in either of its positions.

One form of valve assembly incorporating the first, third and fourth slide valves 25, 44, 45, the nonreturn valves 48, 49 and the pilot relief valves 51, 52 in the transmission system for a vehicle such as a straddle carrier for handling large containers is described below with reference to FIGS. 2–5.

The assembly comprises a body having two bores 69, 70. The first bore 69 communicates with four longitudinally spaced ports 71, 72, 73, 74. The end ports 71, 74 (the first and fourth ports) are adapted to be connected respectively to a liquid pressure supply and return and the intermediate (second and third) ports 72, 73 are adapted to be connected to a service to be operated, for example, the hydrostatic motor 28. A first slide valve 25 having lands thereon (constituting selection means) is slidable in the first bore 69, the lands of the valve being arranged so that in a first position of the valve as shown in FIG. 2 the intermediate ports 72, 73 are isolated from one another and are connected to their respective end ports 71, 74, that is the first and second ports 71, 72 are connected and the third and fourth ports 73, 74 are connected. In an operated position of the valve the intermediate ports 72, 73 are connected together and are isolated from the end ports 71, 74. An additional, fifth, port 75 in the body communicates with a passage 76 and a check valve 77 in the first slide valve 25, as shown in FIG. 5, so that in the operated position the fifth port 75 is connected to the intermediate ports 72, 73 to enable a liquid pressure supply to be introduced to the intermediate ports to provide makeup for any loss and a cooling flow. The first slide valve 25 is held in the first position by a biassing spring 78 at one end and moved to the operated position by the application of fluid pressure to a piston 79 at the other end. A sixth port 80 in the valve assembly serves as a drain connection for the slide valve 25.

The second bore 70 communicates with the first and fourth ports 71, 74 and incorporates two oppositely acting nonreturn valves 48, 49 adapted to isolate the first and fourth ports from one another. Both of the nonreturn valves 48, 49 are the same so only valve 48 is shown in detail in FIG. 4. An annular area 81 of the valve 48 is in communication with the first port 71 and the valve is biassed by spring 82 onto a seating 83 which leads into a chamber 84 common to both valves 48 and 49. Each valve has a passage through it in which is located a spring-loaded one-way restrictor 85 having an orifice 86 protected by a sintered metal filter 87. The restrictor 85 is arranged to permit restricted flow from the common chamber 84 to a poppet type pilot relief valve 51 and to permit free flow in the opposite direction. The pilot relief valve 51 is arranged in line with the nonreturn valve 48 and on the side of the nonreturn valve remote from the common chamber 84. The pilot relief valve is loaded by a spring 88 which bears on a stop 89 that can be adjusted to alter the setting of the valve and that can be locked at any one setting by a nut 91. A second pilot relief valve 52 is located in the equivalent position with respect to nonreturn valve 49.

Also in the valve assembly third and fourth slide valves 44, 45 are provided at right angles to the two bores 69, 70, an end of valve 44 being in communication with the first port 71, and an end of valve 45 being in communication with the fourth port 74 so as to constitute pressure responsive valves. Each slide valve 44, 45 is spring biassed into a position in which a passage 92, 93 from the downstream side of its associated pilot relief valve 51, 52 communicates with ports 94, 95 in the body. When the pressure in the respective first or fourth ports 71, 74 rises to a predetermined value the third or fourth slide valve 44, 45 is operated selectively to seal off the passage 92, 93 from the downstream side of the first or second pilot relief valve 51, 52 respectively.

When using this valve assembly in the circuit of FIG. 1, the first and fourth ports 71, 74 are connected to the pump 2 via the direction selection control valve 17, the second and third ports are connected to the motor 28 and the fifth port 75 is connected to the boost pump discharge conduit 11. The ports 94, 95 of the third and fourth slide valves are connected to the direction definition valve 42 and the port for the control piston 79 of the first slide valve 25 is connected to the solenoid operated valve 55.

In the first position of the first slide valve 25 and in one operated position of the direction selection control valve 17 the first port 71 is pressurized, the fourth port 74 is connected to boost pump discharge, the third slide valve port 94 is connected to boost pump discharge through the direction definition valve 42 and the fourth slide valve port 95 is blanked off at the direction definition valve 42. In the other operated position of the direction selection control valve 17 and direction definition valve 42 the fourth port 74 is pressurized and the first port 71 is connected to boost pump discharge, and similarly the connections of the ports of the third and fourth slide valves are reversed, that is the third slide valve port 86 is blanked off and the fourth slide valve port 87 is connected to boost pump discharge.

Considering the case when the first port 71 is pressurized and the first slide valve 25 is in the unoperated position, pressure is applied to the third slide valve 44 so as to blank off the downstream side of the first pilot relief valve 51. Pressure liquid flows to the motor 28 via the first and second ports 71, 72 and is returned via the third and fourth ports 73, 74. The nonreturn valve 48 of the first port 71 opens due to the hydraulic force acting on its annular area 81, admitting pressure liquid to the common chamber 84. The pressure liquid passes through the one-way restrictors 85 so as to act on the sprung ends of the nonreturn valves 48, 49, to close the nonreturn valve 48 of the first port 71 and to maintain the fourth port nonreturn valve 49 closed. The pressure of this liquid may be in excess of that required to open the first and second pilot relief valves 51, 52 but both remain closed because their downstream sides are blanked off by the third slide valve 44 and by the direction definition valve 42 respectively.

If a condition now arises in which pressure reversal takes place, and the direction control valve 17 and the direction definition valve 42 are reverted to the neutral position, the pressure in the fourth port 74 will increase so as to operate the fourth slide valve 45. This will blank off the outlet of the second pilot relief valve 52. The pressure in the first port 71 falls permitting reversion of the third slide valve 44 so that the downstream side of the first pilot relief valve is now connected to boost pump discharge through the direction definition valve 42. The additional pressure acting on the nonreturn valve 49 of the fourth port 74 over its annular area 81 causes this valve to open. The pressure at the fourth port 74 is now communicated to the first pilot relief valve 51 and if this pressure is in excess of the predetermined value the pilot relief valve opens. The nonreturn valve 48 of the first port 71 now opens rapidly since the pressure on its sprung end has been relieved and unrestricted flow is permitted by the one-way restrictor 85 from the pilot relief valve side of the nonreturn valve 48 to the common chamber 84, the one-way restrictor 85 subsequently maintains a pressure drop across the nonreturn valve 48 of the first port 71 so that it remains open. The first and fourth ports 71, 74, and in consequence the second and third ports 72, 73 also, are cross-connected via the common chamber 84 and the retardation applied to the vehicle in consequence of the pressure reversal is held to a controlled value by the setting of the first pilot relief valve.

It will be understood that the pilot relief valves 51, 52 can be set to any required pressure to provide retardation but will normally be set to lift at a lower value than the main relief valve 21 which safeguards the pump circuit, but at a higher value than the boost pump discharge relief valve 7.

If it is required that retardation of the vehicle should be automatically controlled by the pilot relief valves 51, 52 during overrun conditions, that is without having to operate the direction selection control valve 17, then the return line 24 from the motors 28, 33 must be isolated from the boost pump relief valve 7. One possible modification of the hydraulic circuit to meet this requirement is shown in FIG. 6.

A nonreturn valve 96 is placed in the boost pump discharge conduit 6 downstream of the junction between conduit 24 and conduit 6, effectively isolating conduit 24 from the boost pump relief valve 7. In consequence the boost pump discharge, the outlet conduit 23 from relief valve 21, the connection from nonreturn valves 36, 37 and the outlet conduit 18 from the neutral position of valve 17 all have to be connected into conduit 6 upstream of the nonreturn valve 95. Also the outlet conduit 43 from the direction definition valve must be safeguarded from a pressure rise during overrun conditions and it is shown for convenience as being connected to the reservoir 4. It will be noted that the filter 9 and the inlet to the pump 2 are also isolated from boost pump relief valve 7 and during overrun conditions, the pressure in this part of the circuit will be governed by the setting of pilot relief valves 51, 52.

Returning to the circuit of FIG. 1, when the first slide valve 25 of the valve assembly is operated the second and third ports 72, 73 are cross-connected and the boost pump discharge is fed into them via conduit 32, port 75 and check valve 77. Consequently motor 28 is put into an idling condition and full output of pump 2 is fed to motor 33. However, should a pressure reversal condition occur in this case, retardation of the vehicle can be controlled by the valve assembly as before.

It will be appreciated that the circuit of FIG. 1 can be rearranged so that on operation of the second valves 51 and 52 pressure in the system is relieved to the boost pump discharge line 6 or to the reservoir 4. In this arrangement the supply and return lines to the hydraulic motors would not be cross-connected under overrun conditions.

I claim:

1. An hydraulic transmission system comprising a power-driven pump, an hydraulic motor to which fluid under pressure is supplied by the pump and which is coupled to, and normally driving, a member having appreciable inertia, a first valve limiting the maximum pressure in the system, two nonreturn valves, one connected to the motor supply line and the other connected to the motor return line, the downstream sides of the nonreturn valves being interconnected; a second valve located downstream of each nonreturn valve; a pressure responsive valve arranged to be actuated by the pressure upstream of each nonreturn valve, each pressure responsive valve when actuated obstructing flow from its associated second valve and when not actuated permitting flow from its associated second valve; and a third valve permitting flow from either or both of the second valves through their associated pressure responsive valve, the arrangement being such that when the motor is driving the member the pressure in the supply line actuates its associated pressure responsive valve, the outlet of the other pressure responsive valve being obstructed by the third valve so that the maximum pressure in the system is limited by the first valve and when overrun conditions occur and the member is driving the motor, the actuated pressure responsive valve reverts to permit flow through its associated second valve, the second valve, when flow passes through it, limiting the maximum pressure in the system to a predetermined value less than the setting of the first valve thus controlling the retardation of the member.

2. An hydraulic transmission system as in claim 1, wherein each of the second valves is a pilot operated relief valve, whereby pilot flow through the relief valve enables the one-way valve to open and thus to cross-connect the motor supply and return lines.

3. An hydraulic transmission system as in claim 2 wherein said nonreturn valves, said pilot relief valves and said pressure responsive valves are incorporated in a valve assembly comprising a substantially uniform body.

4. An hydraulic transmission system as in claim 1 wherein means are provided to cross-connect the motor supply and return lines on operation of one of said second valves.

5. An hydraulic transmission system as in claim 1 wherein at least two hydraulic motors are each drivingly connected to a separate driven member, said motors being connected to common supply and return lines from the pump, and valve means constructed and arranged for selectively isolating one motor from the pump and for cross-connecting the supply and return lines of said motor permitting it to idle.

6. An hydraulic transmission as in claim 2 wherein two or more hydraulic motors, each driving a separate member, are connected to common supply and return lines from the pump and valve means are provided to isolate one motor from the pump and to cross-connect the supply and return lines of said motor permitting it to idle, said valve means being included in the valve assembly.

7. An hydraulic transmission system as in claim 5 including a vehicle in which said system is incorporated and wherein each driven member is a wheel of the vehicle.

\* \* \* \* \*